(12) United States Patent
Kelch et al.

(10) Patent No.: US 11,931,908 B2
(45) Date of Patent: Mar. 19, 2024

(54) DETECTING ROBOTIC CALIBRATION ACCURACY DISCREPANCIES

(71) Applicant: Intrinsic Innovation LLC, Mountain View, CA (US)

(72) Inventors: Timothy Robert Kelch, San Jose, CA (US); Dirk Holz, Mountain View, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 84 days.

(21) Appl. No.: 17/203,147

(22) Filed: Mar. 16, 2021

(65) Prior Publication Data
US 2022/0297301 A1    Sep. 22, 2022

(51) Int. Cl.
*B25J 9/16* (2006.01)

(52) U.S. Cl.
CPC ... *B25J 9/1692* (2013.01); *G05B 2219/39024* (2013.01); *G05B 2219/50391* (2013.01)

(58) Field of Classification Search
CPC ........ B25J 9/1692; B25J 13/06; B25J 13/089; B25J 9/1664; B25J 9/1605; B25J 9/1671; G05B 2219/39024; G05B 2219/50391; G05B 2219/39026; G05B 2219/39047; G05B 2219/39048
See application file for complete search history.

(56) References Cited

U.S. PATENT DOCUMENTS

2009/0204261 A1\* 8/2009 Strand .................... B25J 19/06
                                                             700/264
2010/0262288 A1 10/2010 Svensson et al.
(Continued)

FOREIGN PATENT DOCUMENTS

EP    1953496    8/2008
EP    3705239    9/2020

OTHER PUBLICATIONS

International Search Report and Written Opinion in International Appln. No. PCT/US2021/054464, dated May 31, 2022, 9 pages.
(Continued)

*Primary Examiner* — Khoi H Tran
*Assistant Examiner* — Tanner L Cullen
(74) *Attorney, Agent, or Firm* — Fish & Richardson P.C.

(57) ABSTRACT

Methods, systems, and apparatus, including computer programs encoded on computer storage media, for measuring and reporting calibration accuracy of robots and sensors assigned to perform a task in an operating environment. One of the methods includes receiving a request to perform a calibration process for one or more robots in an operating environment; in response, performing the calibration process including executing a calibration program that generates movement data representing movements by the one or more robots within the operating environment; computing a measure of calibration accuracy from the movement data; receiving an input program to be executed in the operating environment; determining that the measure of calibration accuracy does not satisfy an accuracy tolerance of the input program; and in response, generating a notification representing that the measure of calibration accuracy generated from performing the calibration process does not satisfy the accuracy tolerance of the input program.

20 Claims, 4 Drawing Sheets

(56) References Cited

U.S. PATENT DOCUMENTS

| | | | |
|---|---|---|---|
| 2013/0211782 A1* | 8/2013 | Rosenberg | B25J 9/16 702/182 |
| 2014/0148949 A1* | 5/2014 | Graca | B25J 9/1682 700/248 |
| 2016/0136815 A1* | 5/2016 | Linnell | B25J 9/1676 700/255 |
| 2016/0346929 A1 | 12/2016 | Yang et al. | |
| 2017/0157770 A1* | 6/2017 | Lundberg | B25J 9/1692 |
| 2020/0306977 A1 | 10/2020 | Islam et al. | |
| 2020/0324414 A1* | 10/2020 | Islam | B25J 9/1697 |
| 2020/0376657 A1* | 12/2020 | Adachi | B25J 9/1697 |

OTHER PUBLICATIONS

Tabb et al., "Solving the robot-world hand-eye (s) calibration problem with iterative methods," Machine Vision and Applications, Aug. 2017, 28(5):569-90.

Wikipedia.com [online], "Hand Eye Calibration Problem," Sep. 16, 2019, retrieved on Feb. 23, 2021, retrieved from URL<https://en.wikipedia.org/wiki/Hand_eye_calibration_problem>, 3 pages.

International Preliminary Report on Patentability in International Appln. No. PCT/US2021/054464, dated Sep. 28, 2023, 6 pages.

* cited by examiner

DETECTING ROBOTIC CALIBRATION ACCURACY DISCREPANCIES

BACKGROUND

This specification relates to robotics, and more particularly to automatically measuring the calibration of robots and sensors assigned to perform a task in an operating environment.

In robotics systems, the physical robotic movements to perform tasks are often scheduled by manual pre-programming. For example, a warehouse robot that moves boxes can be programmed to pick up a box at the entrance of a warehouse, move it, and put it down in a target zone of the warehouse. For another example, a construction robot can be programmed to pick up a beam and put it down onto a bridge deck. As each of these actions can include many movements that require high precision, a slight error in the measurement of a robot pose or a pose of a detected object can result in failure of the task. Moreover, errors at an early stage in the process can result in accumulated errors in robotic movements later in the task, further resulting in failed tasks using a pre-programmed schedule.

Thus, systems having multiple robots and sensors can use various techniques to calibrate their components and calculate one or more measures of calibration accuracy. For example, some systems adopt hand-eye calibrations in an operating environment, e.g., a workcell, to optimize calibration. The measure of calibration accuracy can be, for example, an accumulation of discrepancies of all components in an operating environment or a weighted average of calibration error of all components in the operating environment. The calibration errors and discrepancies can be represented, for example, as a scalar value representing a difference between a measured pose and a reference pose of a robot or sensor. In this specification, a reference pose refers to a substantially accurate pose, e.g., a pose as viewed from a reference location.

In an ideal operating scenario, the positions and orientations of each of a plurality of sensors and robots are always perfectly calibrated. That is, there is no discrepancy between a measured pose and a reference pose of a calibrated robot. For perfectly calibrated robots in an operating environment, and assuming that the robots do not shift away from the initial calibrations, the robots can implement instructions to perform tasks with high precision and without accumulating any calibration errors after cycles of operations.

However, in practice there are often substantial discrepancies in calibrated robots and sensors in an operating environment. While the discrepancies can be significantly smaller than that of the robots before calibration, it is concerned whether the calibrated robots in the operating environment with certain calibration accuracy can perform one or more tasks within one or more accuracy tolerance, if so, whether the calibrated robots can maintain the accuracy for performing the task after a few cycles of operations. For example, when performing a particular task, a calibrated operating environment may have an average error (i.e., calibration accuracy) of 0.5 units, but the task requires that each error of the operation environment measured at a given time step during the operating environment is performing the task cannot be greater than an accuracy tolerance of 0.1 units. As another example, a calibrated operating environment has a precision level with the last significant figure being in the tenths place, and the task requires the same precision level. However, one or more robots might shift away from the initially calibrated poses after a few operation cycles. Thus, the accuracy for performing the task by the calibrated operating environment might decrease, for example, with the last significant figure becoming in the ones place. The physical units for both calibration accuracy and accuracy tolerance can be any appropriate unit for calibration accuracy and accuracy tolerance, and can each be represented using a scalar, vector, or tensor without a corresponding physical unit of measure. Thus, in this specification where units are not specified, any appropriate unit of measure can be used. In situations where the calibration accuracy represents a physical quantity with a physical unit, the comparison between the calibration accuracy and the accuracy tolerance can be conducted under the same physical unit.

Conventionally, calibrated robots in an operating environment can be determined to perform a task within an accuracy tolerance after users have set up the robots and sensors, or after the robots have performed at least a portion of the task. It is not desirable as it is a waste of time and funds to find that the robots in the operating environment are incapable of performing a task until the robots have performed the task halfway. Alternatively, it is not uncommon for robots in an operating environment to fail to satisfy the accuracy tolerance after repeatedly performing the task for a few cycles, while they have a high precision initially for performing the task.

SUMMARY

This specification describes techniques used to determine whether one or more robots in an operating environment can perform a task within a prescribed accuracy level before physically performing the task. The specification also describes techniques to determine whether an initially suitable task for robots in an operating environment can still be qualified to continue performing the task after a few operation cycles before starting each cycle. The described techniques also include a method for prompting one or more notifications indicating that the robots cannot fulfill the task within a certain accuracy level.

Particular embodiments of the subject matter described in this specification can be implemented to realize one or more of the following advantages.

The techniques described below can increase operational efficiency by decreasing the time and costs required for configuring robots to perform tasks in an operating environment to a sufficient level of accuracy. A system incorporating the disclosed techniques can simulate a virtual representation for an operating environment with a plurality of robots to determine if the robots in the operating environment can perform the task within a certain accuracy tolerance. The system can also prompt a notification indicating a discrepancy between an accuracy tolerance and a measured calibration accuracy. Thus, users of the system can quickly understand if the robots in the operating environment are suitable for performing the task within the accuracy level, saving a significant amount of time and cost compared to conventional methods.

In addition, the disclosed techniques can monitor and enhance the quality of performing tasks in an operating environment. A system incorporating the disclosed techniques can determine if robots in an operating environment can continue performing a task after performing multiple operation cycles by monitoring a change or a rate of change in calibration accuracies or errors within a time interval. For example, the system can repeatedly calculate a measure of calibration of accuracy for one or more robots in the operating environment after every two, five, or ten operations cycles.

Moreover, the disclosed techniques are intuitive to use for users. The system can present at least one of the following information on a user interface: a notification of calibration accuracy discrepancy, a measured accuracy for robots performing a task, a required accuracy tolerance for performing the task, or poses of robots and sensors in the operating environment before and after performing the task. Users of a system incorporating the disclosed techniques can view the information listed on the user interface conveniently and make decisions accordingly.

Furthermore, the described techniques can assist a user in choosing a proper calibration program. For example, the user can determine if a calibration program is suitable for calibrating robots in an operating environment. To make this determination, the user can review the calibration accuracy that the calibration program can achieve for the operating environment and compare the best calibration accuracy to the desired accuracy tolerance for performing one or more tasks.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
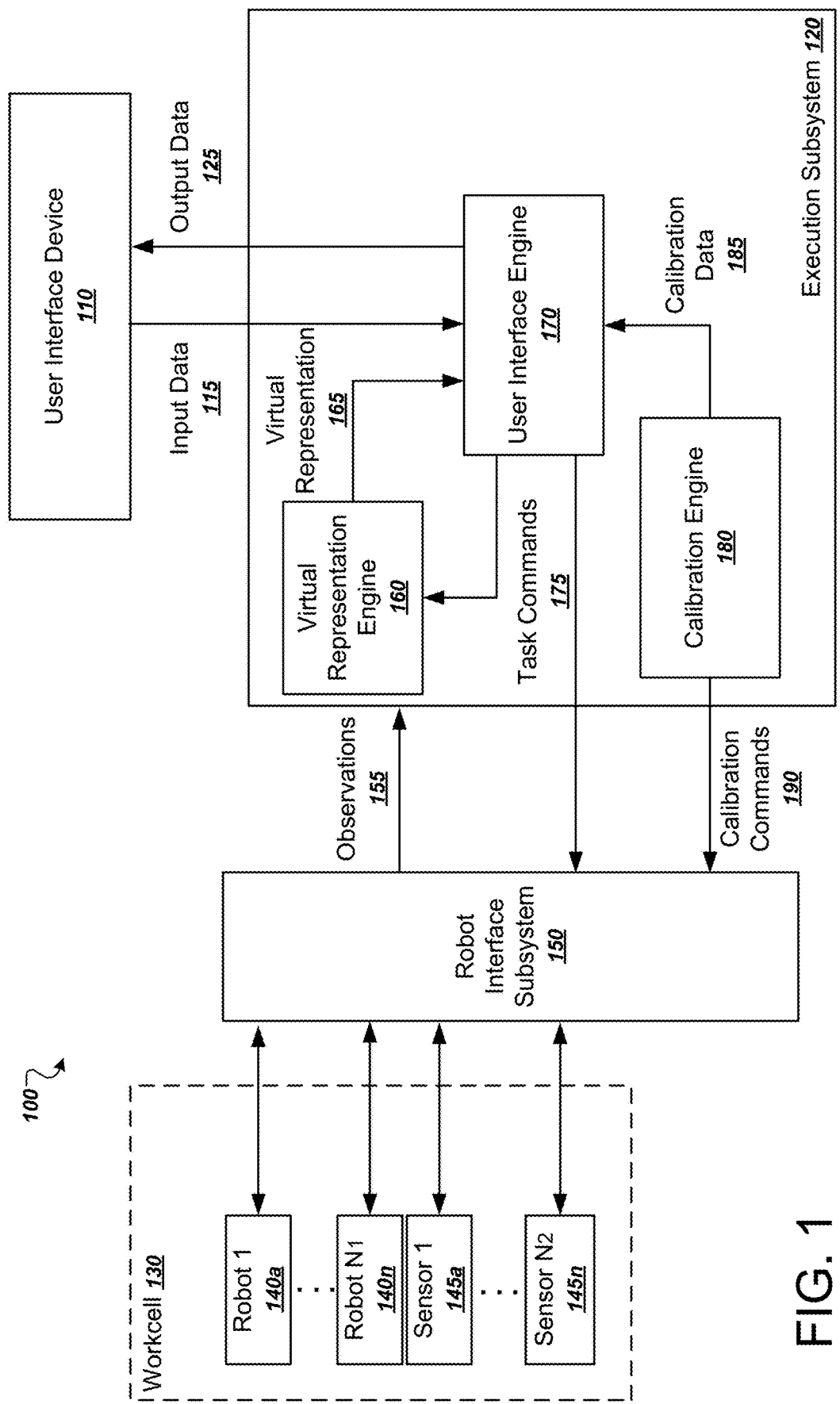
FIG. 1 illustrates an example system to measure and report accuracy discrepancies in an operating environment.

FIG. 1 illustrates an example system 100 to measure and report calibration accuracy discrepancies for performing a certain task in an operating environment 130. In this specification, a calibration accuracy discrepancy, or for brevity, an accuracy discrepancy, refers to a situation in which a measure of calibration accuracy for a robotic system is insufficient for an accuracy tolerance of a particular task to be performed by the robotic system. Thus, the notion of an accuracy discrepancy is generally specific to a task being performed and a system's measure of calibration accuracy can be an accuracy discrepancy for some tasks but not others. Generally, a measure of calibration accuracy is insufficient for a particular task when the measure of calibration accuracy has a larger magnitude than an accuracy tolerance for a particular task. For example, if a particular task has an accuracy tolerance that requires a tool to be moved to within 2 cm of a goal location, a measure of calibration accuracy representing accuracy to within 3 cm can be an instance of a calibration accuracy discrepancy, while accuracy to within 1 cm might not be a calibration accuracy discrepancy.

The measure of accuracy discrepancy can be represented using any appropriate value or tuple of values. For example, the accuracy discrepancy can be represented using a signed value representing a difference between the magnitudes of the accuracy tolerance and the calibration accuracy for a robotic system to perform a task. Alternatively or in addition, the measure of accuracy discrepancy can be any proper comparison between the accuracy tolerance and the calibration accuracy, for example, a ratio of the calibration accuracy to the accuracy tolerance, or a binary symbols (e.g., 0 and 1). A positive value for the accuracy discrepancy can represent the measure of calibration accuracy is insufficient for performing a particular task requiring a particular accuracy tolerance.

In FIG. 1, a robot workcell 130 is used as an example of a physical operating environment. The techniques described in this specification can also be used to detect accuracy discrepancies for other operating environments that are not workcells. In addition, as will be described below, the techniques described in this specification can also be used to detect calibration accuracy discrepancies in virtual operating environments, e.g., as simulated by the virtual representation engine 160.

The functional components of the system 100 can be implemented as computer programs installed on one or more computers in one or more locations that are coupled to each other through any appropriate communications network, e.g., an intranet or the Internet, or a combination of networks. The system 100 includes a user interface device 110, an execution subsystem 120, and a robot interface subsystem 150. The system 100 can calibrate a plurality of calibration entities such as robots 140 and sensors 145 in the workcell 130 as well as compute a measure of calibration accuracy of the workcell 130. The system 100 can then obtain an accuracy discrepancy between the measured calibration accuracy and a particular accuracy tolerance for performing a task in the workcell 130.

Users of the system 100 can provide data representing one or more input programs and parameters to the system 100 using the user interface device 110. For example, the one or more input programs can be instructions that, when executed by one or more robots in an operating environment, cause the one or more robots to perform operations to fulfill one or more tasks. The parameters can include, for example, a user-determined accuracy tolerance required for performing a task by robots in the workcell 130. The user interface device 110 of the system can be any appropriate stationary or mobile computing device, for example, a desktop computer, a workstation in a robot factory, a tablet, a smartphone, or a smartwatch, to name just a few examples.

The user interface device 110 can provide input data 115 to the execution subsystem 120. The user interface device 110 can receive output data 125 from the execution subsystem 120. In some implementations, the output data 125 includes data representing at least one of the following: one or more accuracy discrepancies, an accuracy tolerance for performing a task, a measured calibration accuracy of the operating environment, or measured poses of calibration entities (e.g., robots 140, sensors 145) before and after performing the task. The user interface device 110 can then present a representation of the received output data 125. The user interface device 110 can for example present a graphical user interface having one or more output panes to present a graphical representation of the output data 125. For example, the output panes can include a notification pane, a calibration pane, and an accuracy pane. As another example, the user interface device 110 can generate, within a notification pane, a notification representing an accuracy discrepancy of performing a task in an operating environment.

The execution subsystem 120 of the system 100 includes a virtual representation engine 160, a user interface engine 170, and a calibration engine 180. In some implementations, the execution subsystem 120 drives the execution of one or more robots 140 in the workcell 130 to perform one or more tasks according to task commands 175. The execution subsystem 120 can receive observations 155 generated by sensors in the robot interface subsystem 150. In some implementations, observations 155 includes data capturing the poses of one or more calibration entities, e.g., robots 140 and sensors 145, in the workcell 130.

The virtual representation engine 160 can generate one or more virtual representations 165 of robots in the workcell 130. In some implementations, the virtual representations 165 can include data representing a virtual copy of calibration entities in the physical workcell 130 according to digital models, e.g., CAD models, of the entities, observations made by sensors in the workcell 130, or both. For example, a virtual representation 165 can include data representing respective poses of all calibration entities in the workcell 130, and optionally a virtual reference frame that can be used for calibration. The system 100 can, using the one or more virtual representations 165, determine if one or more input programs can be successfully implemented by one or more physical robots in the workcell 130 within a particular accuracy tolerance, or if an accuracy discrepancy exists.

The calibration engine 180 can adjust the calibration parameters of entities in the workcell. For example, the calibration engine 180 can perform a calibration optimization process to determine calibration parameters of the entities, a process that can involve generating observation data about how the entities move and are observed. To do so, the calibration engine 180 can generate calibration commands 190 and provide the calibration commands 190 to the robot interface subsystem 150 in order to drive movements and observations of calibration entities in the workcell 130. The calibration engine 180 can then perform a calibration optimization process. For example, the calibration engine 180 can use a plurality of constraint pairs to optimize calibration parameters of the workcell 130. An example calibration optimization process is described in more detail in common-owned U.S. application Ser. No. 17/089,332, which is incorporated herein by reference. The calibration engine 180 can then adjust poses of calibration entities of the workcell according to the results of the optimization process.

The calibration engine 180 can generate a measure of calibration accuracy for entities in a physical workcell 130. The measure of calibration accuracy can include scalars, vectors, and tensors representing how accurately the calibration has been performed by the system on one or more associated entities in the workcell 130. For example, the measure of calibration accuracy can represent how accurately each of the calibrated entities are posed after the calibration. As another example, the measure of calibration accuracy can represent how accurately each calibrated entity can move to a destination position. In some implementations, the calibration engine 180 can generate a measure of calibration accuracy by measuring one or more differences between respective current poses of calibrated entities and the corresponding exact poses determined by the calibration process. Alternatively or in addition, the calibration engine 180 can generate a measure of calibration accuracy by measuring one or more differences between respective positions that the calibrated entities would move to under particular instructions, and corresponding exact positions that the calibrated entities are instructed to move to. The differences representing a measure of accuracy can be in a scalar form as a root-mean-square deviation value. Alternatively or in addition, the measure of accuracy can be in a vector form, in which each entry of the vector can represent a respective difference of one or more entities in a corresponding dimension.

The calibration engine 180 can also generate a measure of calibration accuracy for a virtual representation 165 in the corresponding virtual operating environment. The system 100 can generate a virtual representation of the workcell 130 before or after the workcell 130 has been calibrated. For example, the system 100 can first calibrate a workcell 130 using calibration commands 190 and generate a virtual representation 165 of the calibrated workcell. As another example, the system 100 can generate a virtual representation 165 of an un-calibrated workcell 130, and then adjust the workcell 130 and the virtual representing 165 substantially simultaneously, according to calibration data 185 and the calibration commands 190 output from the calibration engine 180. Then, the calibration engine 180 can generate a measure of calibration accuracy of the virtual representation similarly as described for the physical workcell 130. For example, the engine 180 can generate the measure of calibration accuracy using a root-mean-square deviation value that represents differences of current poses and corresponding exact poses of virtual copies of entities in the virtual representation.

The calibration engine 180 can select, from measures of calibration accuracy for the physical workcell or the corresponding virtual representation, a measure of calibration accuracy for the robotic system. In some implementations, the calibration engine 180 randomly selects a measure of calibration accuracy, because the measures of calibration accuracy for both the physical workcell and the corresponding virtual representation are substantially similar.

The user interface engine can receive as input (i) input data 115 from the user interface, (ii) a virtual representation 165 of the workcell 130, and optionally (iii) calibration data 185 from the calibration engine 180. In some implementations, the user interface engine 170 can generate a measure of calibration accuracy of a virtual representation 165 of a calibrated workcell 130. Alternatively or in addition, for a virtual representation 165 of a un-calibrated workcell 130, the user interface engine 170 can first calibrate the virtual representation 165 of an un-calibrated workcell 130 based on calibration data 185, and then generate a measure of calibration accuracy after the calibration process.

The input data 115 can include instructions and one or more accuracy tolerances for performing one or more tasks as described above. The user interface engine 170 can determine an accuracy tolerance for the task based on the input data 115. In some implementations, the accuracy tolerance is a predetermined value set by a user. In some other implementations, the accuracy tolerance can be the same as or derived from the measured calibration accuracy of the virtual representation 165 of the virtual operating environment, or the calibrated entities in the workcell 130 or from any other appropriate mechanism for electronic data transfer. For example, the accuracy tolerance can be determined based on data previously stored in and transferred from any suitable memory device.

The user interface engine 170 can generate task commands 175 according to the input data 115 and provide the task commands 175 to the virtual representation engine 160 for performing the task in the virtual representation 165. Next, the user interface engine 170 can obtain a measure of accuracy for performing the task using the virtual representation 165.

The measure of accuracy for performing the task can be the same as the calibration accuracy generated for the virtual representation 165 in the virtual operating environment. The user interface engine 170 therefore can set the measure of accuracy for performing the task, as the generated calibration accuracy after calibrating the entities in the virtual operating environment.

Alternatively, the user interface engine 170 can derive the measure of accuracy for performing the task from the calibration accuracy. For example, the user interface engine 170 can predict an accuracy for performing a task according to the virtual representation 165, the task, and the calibration accuracy of the virtual representation. The predicted accuracy for performing the task can be greater than or equal to the calibration accuracy. More specifically, the predicted accuracy for performing the task can depend on a level of complexity of the virtual configuration, for example, a level of density of entities in the virtual representation (e.g., number of entities in a unit space), or a level of interconnections among respective virtual copies of entities (e.g., number of joints in a robot in the virtual representation), or a level of complexity of the task, to name just a few examples.

The user interface engine 170 can generate an accuracy for performing a task by virtually implementing the task on the virtual representation. The user interface engine 170 can simulate each copy of entities in the virtual representation to move from a respective initial position before implementing the task to an end position after implementing the task. Then, the user interface engine 170 can generate a measure of accuracy for entities in the virtual representation, based on differences of the respective end positions and the exact positions required by the task. Similarly, the user interface engine 170 can also use root-mean-square deviation value to represent the measure of accuracy for performing the task based on the differences. This is a similar process of measuring a calibration accuracy. Therefore, the measure of accuracy for performing a task on a virtual representation is also referred to as calibration accuracy below for simplicity.

Next, the system 100 can determine if the virtual representation 165 of the virtual operating environment is capable of performing the task within the accuracy tolerance. To determine, the user interface engine 170 can compare the measured calibration accuracy with the accuracy tolerance. For example, if the measured calibration accuracy is lower than the accuracy tolerance, the user interface engine 170 can determine that the virtual representation 165 is not capable of performing the task within the accuracy tolerance. If the user interface engine 170 determines that the virtual representation 165 can perform the task within the required accuracy tolerance, the user interface engine 170 can output task commands 175 to the robot interface subsystem 150 for controlling the robots 140 to perform the task by robots in the workcell 130. Otherwise, the user interface engine 170 can add a message in the output data 125 indicating an accuracy discrepancy between the measured calibration accuracy and the accuracy tolerance. Upon receiving the output data 125, the user interface 100 can generate a notification, optionally with visual or tactical warnings in any proper form, to be presented in a notification pane for users.

In some implementations, after determining the virtual representation 165 can perform a task within a corresponding accuracy tolerance, the system 100 can instruct one or more robots in the operating environment 130 to repeatedly execute the input program (e.g., perform the task) through the robot interface subsystem 150. The input program, for example, can be picking up and transporting a beam from a first location to a second location using one or more robots. The system 100 can periodically recompute a measure of calibration accuracy for the operating environment 130 when the one or more robots in the environment perform the task repeatedly. For example, the system 100 can recompute a measure of calibration accuracy after every other cycle of performing the task. As another example, the system 100 can recompute a measure of calibration accuracy at a fixed time interval, for example, every 30 minutes, 90 minutes, or 4 hours.

After recomputing the measure of calibration accuracy, the system 100 can determine if the calibration accuracy, a derivation of the calibration accuracy, or in particular, a measured accuracy for performing the task in the operating environment based on the calibration accuracy, does not satisfy the accuracy tolerance required for performing the task. The system 100 can send instructions to robots in the operating environment 130 for terminating executing of the task, and optionally, the system 100 prompts a notification on the user interface device 110, indicating an accuracy discrepancy between the newly obtained calibration accuracy for the operating environment 130 and the accuracy tolerance required for performing the task.

In some implementations, the accuracy tolerance for performing a task by one or more robots in the operating environment can be adjusted while the robots are repeatedly executing the task. For example, the system 100 can generate a time-dependent or cycle-dependent accuracy tolerance automatically, in which the accuracy tolerance can, for example, decrease 5% at each time or cycle interval. As another example, users can input a new accuracy tolerance through the user interface at any time to override the tolerance accuracy currently in use. Each time the accuracy tolerance is changed, the system 100 obtains another calibration accuracy in the operating environment 130 and determines the obtained calibration accuracy satisfies the new accuracy tolerance for performing the task in the operating environment 130.

In some implementations, an input program or a task, indicated in the input data 115, is performed by only a portion of robots 140 in the operating environment 130 within a certain accuracy tolerance. The system 100 can first calibrate the corresponding robots and obtain a measure of calibration accuracy only for the portions of robots to perform the task. The system accordingly determines if the obtained calibration accuracy satisfies the accuracy tolerance specified for performing the task by the portion of robots.

Figure 2:
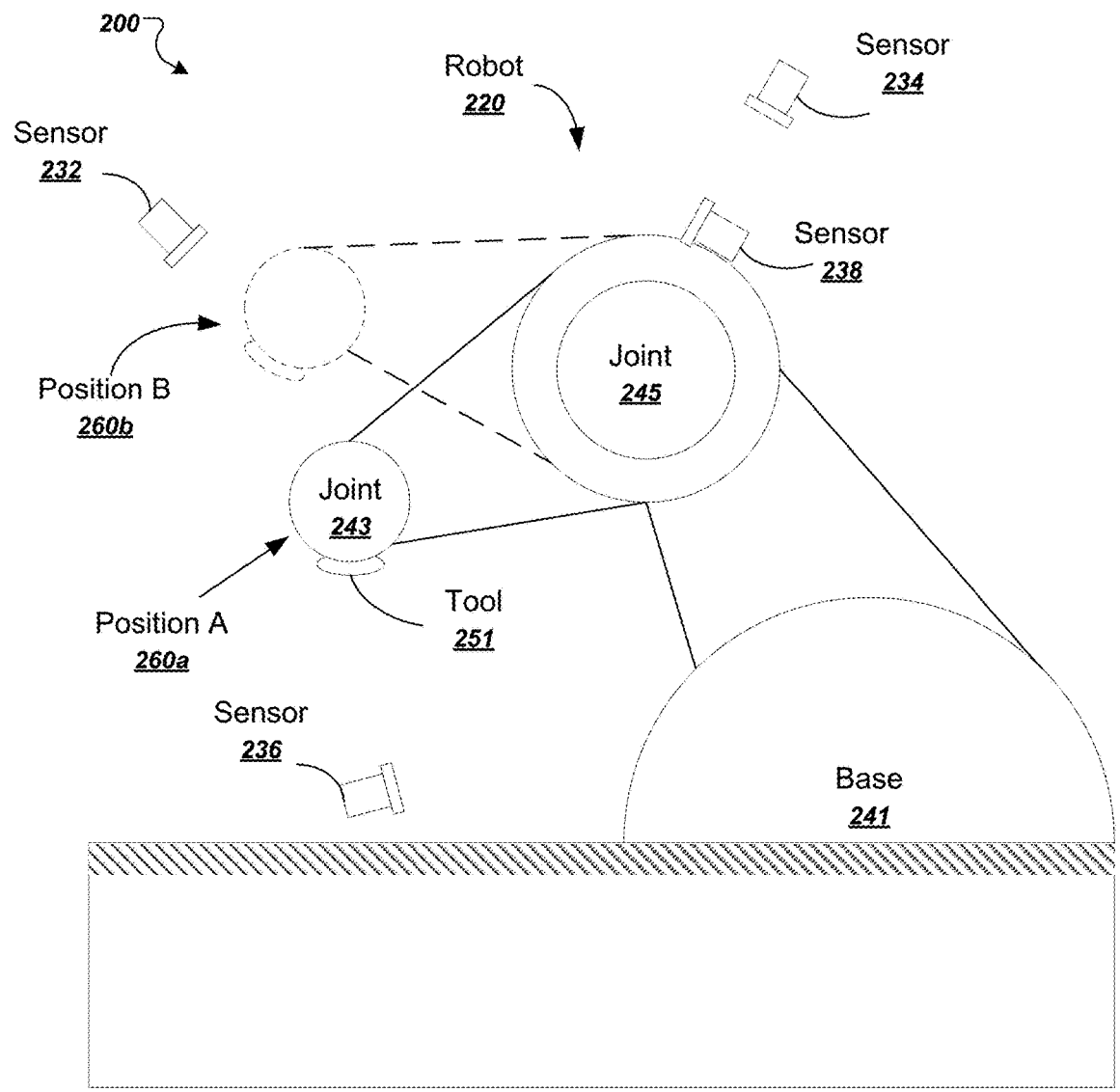
FIG. 2 illustrates an example of a robot and a plurality of sensors performing a task in an operating environment.

FIG. 2 illustrates an example of a robot 220 and a plurality of sensors 232, 234, 236, and 238 performing a task in an operating environment 200.

As shown in FIG. 2, a robot 220 can include a base 241, moveable components, e.g., robotic arms, connected by joints 243, 245, and a tool 251. The system 100 can include one or more robots and sensors in an operating environment, calibrate the one or more robots and sensors, and drive the one or more robots to perform one or more input programs (e.g., tasks).

To calibrate a robot of all robots (e.g., robot 220) in the operating environment, the system 100 can include one or more sensors 232, 234, 236, and 238 for detecting a respective pose of each component of the robot 220 with respect to a coordinate frame, e.g., a reference coordinate frame. The respective pose of each component of the robot 220 can include data representing translational and rotational degrees of freedom of the component in a two-dimensional or three-dimensional domain. For example, the sensor 236 can be associated with the base 241 of the robot 220 to detect both translational and rotational degrees of freedom of the base 241 with respect to a coordinate frame. As another example, the sensor 232 can be associated with the joint 243 of the robot 220 to detect rotational degrees of freedom of the joint 243 with respect to a different coordinate frame. As another example, the sensor 238 is located on the robot 220, and configured to measure poses of the robot 220 and poses of other entities in the operating environment with respect to the coordinate frame of the robot 220. While there are only three sensors (232, 234, and 236) located external to the robot 220, and one sensor 238 located on the robot 220 for the ease of illustration, there can be more sensors located within the operating environment. For example, the operating environment can include 8 sensors located external to the robot 220, and 3 sensors each located on a joint of the robot 220.

Translational and rotational degrees of freedom for each respective pose can be quantified with respect to a coordinate frame. For example, the coordinate frame can be the world coordinate frame of the virtual representation of the operating environment. The world coordinate frame can also be referred to as a reference coordinate frame. The world coordinate frame is typically assumed fixed and serves as an overall reference for calibrating entities in the operating environment. In this context, "fixed" means being static and not involved in optimization processes when an operating environment, e.g., a workcell, is under calibration. As another example, the coordinate frame can be a coordinate frame defined by a component (e.g., base, joint, or a tool) of the robot 220, or one of the sensors in the operating environment.

To calibrate one or more robots and sensors in the operating environment, a system can construct one or more optimization constraints based on respective poses of the one or more robots and sensors. For example, the optimization constraints can be one or more hand-eye calibrations. As another example, the optimization constraints can be one or more different constraint pairs, e.g., relative pose constraints, feature pose constraints, feature point constraints, distance constraints, chained constraints, and combined constraints of different constraint pairs.

After constructing the above-described constraint pairs for calibration entities in the operating environment, the system 100 can generate calibration parameters in order to optimize a global error. To optimize the global error, the system can minimize a sum of local errors, each defined by one of the constructed constraint pairs. In this description, the optimized or minimized global error for each calibration process will be referred to as a measure of calibration accuracy. For example, the calibration accuracy can represent an absolute value of a difference between one or more measured poses and expected poses for corresponding calibration entities in the operating environment. More specifically, the difference is represented by a root-mean-square deviation value as similarly described above. In some implementations, the calibration accuracy is of a scalar form that represents a weighted sum of absolute values for difference across each calibration entity. Alternatively or in addition, the calibration accuracy can be of a vector or tensor form representing a respective global error for each coordinate of all calibration entities, e.g., a first global error in a first translational direction, or a second global error in a third rotational direction. In some implementations, the calibration accuracy can measure a weighted sum of errors associated with a portion of robots in the operating environment.

For example, referring to FIG. 2 and in connection with FIG. 1, the system can drive and calibrate entities including the physical robot 220 and sensors 232, 234, and 236 in the operating environment according to calibration commands. The calibrated entities in the operating environment can have a calibration accuracy associated with the calibration commands 190. For example, the calibration accuracy can be a real scalar value, e.g., 0.01, 0.1, or 0.5. Alternatively or in addition, the system can generate a virtual representation and calibrate the virtual copies of at least a portion of calibration entities, e.g., the robot 220 and the sensors 232, 234, and 236, according to calibration data. The calibration data for the virtual representation can represent the counterpart to the calibration commands for physical robots in the physical operating environment. Similarly, the final calibrated virtual copies of entities in the virtual representation can have the same calibration accuracy as that for physical entities in the operating environment.

After optimizing the calibration accuracy for calibration entities, the system can drive one or more virtual copies of physical robots in the virtual representation to perform one or more input programs, or drive corresponding physical robots in a workcell. For example, as shown in FIG. 2, the system can drive the virtual copy of the physical robot 220 to perform an input program, e.g., moving the tool 251 from position A 260*a* to position B 260*b* in the virtual representation. The system can then measure a level of accuracy for one or more robots, e.g., robot 220, to perform the tasks specified by the input program. As similarly described above, in some implementations, the measure of accuracy for performing the task can be the same as the calibration accuracy for the operating environment 130. In these situations, the system uses the calibration accuracy as the measure of accuracy for one or more robots performing the task in the operating environment 130.

The system also can determine if the calibration accuracy satisfies an accuracy tolerance, for example, a user-determined accuracy tolerance as represented in the input data. In some implementations, if the system determines that the calibration accuracy satisfies the accuracy tolerance, the system 100 can then drive one or more physical robots 140 in the workcell 130 to perform tasks specified by the input program. For example, referring to FIG. 2, if the system determines that the calibration accuracy for the virtual copy of robot 220 in the virtual representation 165 to perform the task of moving the tool 251 from position A to position B satisfies the accuracy tolerance represented in the input data 115, the system 100 can provide commands to operate, or directly drive, the physical robot 220 in the workcell to perform the task.

If the calibration accuracy does not satisfy the accuracy tolerance, the system can report a accuracy discrepancy and take appropriate action.

Other embodiments of detecting robotic accuracy discrepancies in an operating environment using the system 100 are described in more detail below.

Figure 3:
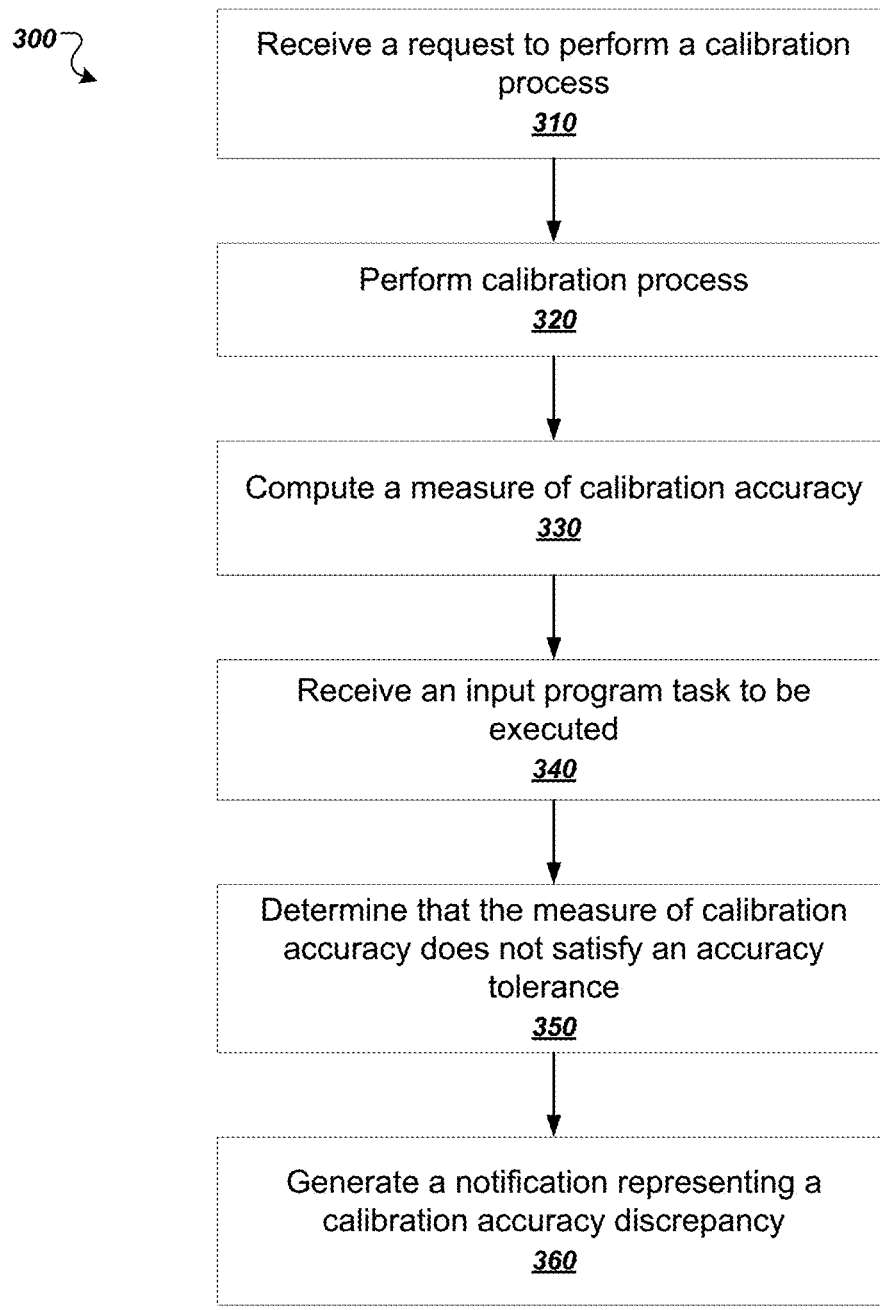
FIG. 3 is a flow diagram of an example process of determining an accuracy discrepancy using the system.

FIG. 3 is a flow diagram of an example process 300 of determining an accuracy discrepancy using the system 100. For convenience, the process 300 will be described as being performed by a system of one or more computers located in one or more locations. For example, a system for measuring and reporting calibration accuracy, e.g., the system 100 of FIG. 1, appropriately programmed, can perform the process 300.

The system 100 receives a request to perform a calibration process for one or more robots in an operating environment (310).

The system 100 performs the calibration process, including executing a calibration program that generates movement data representing movements by one or more robots within the operating environment (320). For example, an execution subsystem can provide calibration commands to drive one or more robots in the operating environment.

The system computes a measure of calibration accuracy (330). The system can use any appropriate measure of calibration accuracy. For example, the system can use a sum of local errors of corresponding constraint pairs as defined by the calibration engine. The system can also use a root-mean-square deviation value computed from local errors of components in the system. The root-mean-square deviation value can be calculated by the system based on differences of current poses and exact poses of respective entities in the operating environment. For example, the differences can be the computed as the accumulated squared differences between each current pose and each exact pose in each dimension for all entities. The system can generate the root-mean-square deviation by taking the root of the accumulated squared differences.

The system can generate a calibration accuracy representing a calibration error for calibration entities in one or more dimensions. More specifically, in connection to the local errors, the system can obtain each local error based on a full local residual, including data representing a difference between the measured pose and the desired pose of a calibrated entity in each dimension. Therefore, the system can generate a calibration accuracy representing calibration errors in one or more dimensions based on the full local residuals.

The system can generate a calibration accuracy in the form of a probability distribution, or based on one or more probability distributions. More specifically, the system can generate a calibration error distribution based on multiple calibration errors from repeatedly calibrating a particular entity using a particular constraint type. The system can also generate a covariance for calibration error distributions between multiple entities interconnected by a plurality of constraints. The system can therefore generate a calibration accuracy based on the individual calibration error distributions. Alternatively or in addition, the system can generate a probability distribution for the calibration accuracy based on the individual calibration error distributions.

The system receives an input program to be executed by one or more robots in the operating environment (340).

As described above, the operating environment can be a virtual environment having a virtual representation of robots in a workcell, or the operating environment can be a physical workcell having physical robots and sensors.

The system determines that the measure of calibration accuracy generated from performing the calibration process does not satisfy an accuracy tolerance of the input program (350). For example, the accuracy tolerance associated with the input program can be pre-determined by a user and can be specified in the input program. Alternatively or in addition, the accuracy tolerance can be determined after the system performs a calibration process. For example, the system can use the measure of calibration accuracy as an accuracy tolerance, which effectively causes the system to flag any input programs that could cause calibration accuracy discrepancies. In some implementations, the system can derive the accuracy tolerance from the measured calibration accuracy, for example, the accuracy tolerance can be 50% of the calibration accuracy or 200% of the calibration accuracy.

The system generates a notification representing a calibration accuracy discrepancy (360). For example, the measure of calibration accuracy generated from performing the calibration process may not satisfy the accuracy tolerance of the input program. The system can then generate any appropriate notification to represent the calibration accuracy discrepancy. In some implementations, the system can generate a user interface presentation to be displayed by a user interface device. The user interface presentation can indicate that the measure of calibration accuracy generated from performing the calibration process does not satisfy the accuracy tolerance of the input program. The user interface presentation can further include any appropriate visual notification or warning.

The system can condition execution of the input program on the measure of calibration accuracy satisfying the accuracy tolerance. In other words, if and only if the system determines that the measure of calibration accuracy generated from performing the calibration process satisfies the accuracy tolerance, the system can execute the input program in the operating environment. Thus, the system can execute the input program in a virtual representation of the workcell. Alternatively or in addition, the system can drive, or provide commands for driving, corresponding physical robots in a workcell to execute the input program. In other words, the system 100 can operate one or more physical robots to perform one or more tasks represented by the input program.

The system 100 can calibrate the virtual representation and corresponding physical robots in the operating environment simultaneously. The system 100 can provide calibration commands to drive and move robots to desired poses (e.g., substantially exact poses). The system 100 can also provide calibration data to adjust the poses of virtual copies of corresponding robots in the virtual representation.

The user interface presentation can include various types of information relating to the accuracy tolerance and measure of calibration accuracy. For example, the user interface presentation can include data representing which portion of the input program is associated with the accuracy tolerance. As another example, the user interface presentation can include a separate portion through which the user can modify the input program.

The user interface presentation can allow a user to directly set the accuracy tolerance, e.g., when a user specifies an input program. For example, the accuracy tolerance can be specified through an input pane of the user interface presentation, for a user to input a predetermined value to represent the accuracy tolerance. As another example, the accuracy tolerance can be defined implicitly according to data representing poses for each robot to arrive at after performing a task. Alternatively or in addition, the accuracy tolerance can be obtained according to a measure of calibration accuracy. In response to determining the accuracy tolerance is not satisfied, the system can either prevent a start of performing the task in an operating environment, pause, or even terminate any execution of the task in the operating environment.

In response to determining that the actuary tolerance is satisfied, the system 100 can drive one or more physical robots to repeatedly execute the input program in the operating environment, for example, five cycles, ten cycles, or fifty cycles, to name just a few examples. In some implementations, the system can drive one or more robots in the operating environment to execute the input program for an absolute time period, for example, an hour, 10 hours, or 50 hours, to name just a few examples.

The system can recompute a measure of calibration accuracy after a particular condition is satisfied. For example, the system can recompute a measure of calibration accuracy after one or more physical robots have executed the input program for a particular number of cycles or for a particular period of time. For example, the system can recompute the measure of calibration accuracy every five cycles or every 10 hours. This is often useful because as time goes on, physical perturbations of the robots, the sensors, or both can cause the calibration parameters to become less optimal. Therefore, the system can recompute the measure of calibration accuracy in order to determine whether the operating environment still complies with the accuracy tolerance of the input program.

Thus, each time the system recomputes the measure of calibration accuracy for the one or more robots in the operating environment, the system can determine if the recomputed calibration accuracy satisfies the accuracy tolerance specified by the input program. In some implementations, the system can automatically pause or terminate the execution of the input program in the operating environment if an accuracy discrepancy is detected. The system 100 can also prompt a user notification on the user interface device 110 to indicate that the currently recomputed calibration accuracy does not satisfy the accuracy tolerance. The notification can include any appropriate information. If the system determines that the recomputed calibration accuracy satisfies the accuracy tolerance, the system can continue executing the input program in the operating environment.

The accuracy tolerance can be reset by the system automatically when the system recomputes the calibration accuracy. Alternatively or in addition, the accuracy tolerance can be overridden by the user through the user interface. In some implementations, the accuracy tolerance for each recomputation can be derived automatically by the system based on the recomputed calibration accuracy. For example, the system can automatically set the accuracy tolerance after each recomputation as 80% or 120% of the recomputed calibration accuracy, to strict or relax the requirement for continuation of performing the task in the operating environment.

Figure 4:
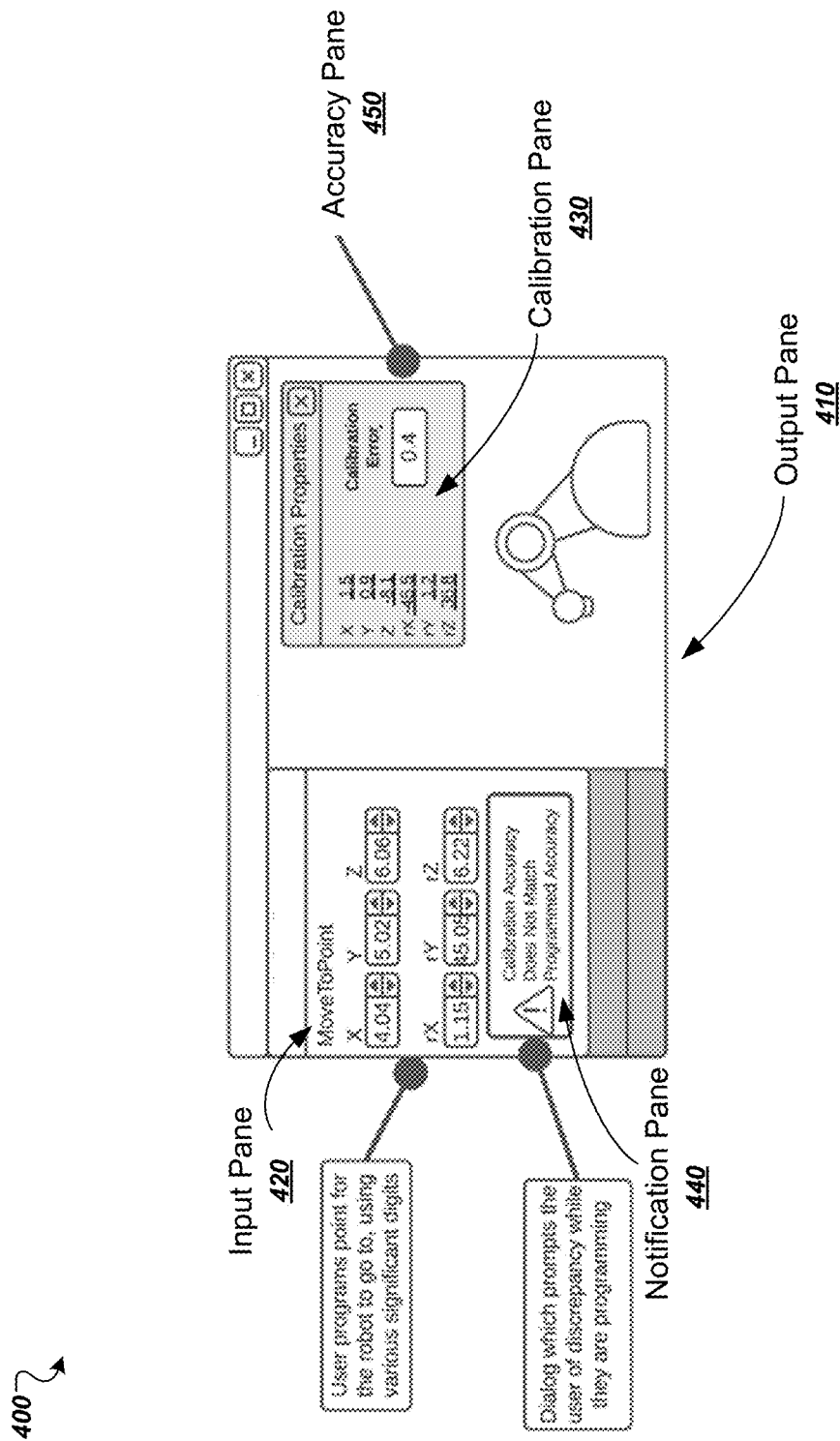
FIG. 4 illustrates an example user interface presentation.

FIG. 4 illustrates an example user interface presentation 400.

As shown in FIG. 4, the user interface presentation 400 can include multiple panes. For example, the user interface presentation 400 can include an input pane 420 and an output pane 410. The output pane 410 can include a notification pane 440, a calibration pane 430, and an accuracy pane 450.

For example, a user interface device can receive user input representing at least one of an input program, a user-defined accuracy tolerance, a calibration request, or data identifying which portion of robots in an operating environment are associated with the input program. For example, the input program can be user-prescribed translational and rotational coordinates, or poses, with respect to a certain coordinate frame. The system can then drive each robot to move to such coordinates or poses within a certain time period. The user can use differing numbers of significant digits when prescribing the coordinates or poses for each robot in the workcell or in a virtual copy of corresponding robots in a virtual representation. In some implementations, the system can implicitly determine an accuracy tolerance based on user input received in the input pane 420. Alternatively, the user can separately set an accuracy tolerance in the input pane 420.

After the system performs a calibration program to optimize the calibration of one or more robots in the operating environment, the system can generate output data 125 and present it in the output pane 410 of the user interface presentation 400. The output data can include an indication of a calibration accuracy discrepancy or of the calibration accuracy itself presented in the accuracy pane 450. In some implementations, the output data can also include a depiction of the respective poses of one or more robots in the operating environment or virtual copies of corresponding robots in the virtual representation. The system can also present the output data in the calibration pane 430 using differing numbers of significant digits associated with the calibration accuracy.

If the system determines that the measure of calibration accuracy presented in the accuracy pane 450 does not satisfy the accuracy tolerance for the input program, the system can generate a notification in the user interface presentation 400 indicating the accuracy discrepancy in the notification pane 440. In some implementations, the system can generate the notification by pushing the notification to a mobile user interface device, accompanying the prompted notification with any appropriate information. In some implementations, the system can also generate notifications in other proper forms such as email notifications, text notifications, or phone calls.

The system can further learn, for example, by training a machine learning model, a candidate accuracy tolerance for a particular operating environment, and suggest the candidate accuracy tolerance to assist the user in setting an accuracy tolerance for the system. More specifically, the system can present the candidate tolerance accuracy in the user interface presentation 400. The candidate tolerance accuracy can include one or more candidate accuracy tolerances or a range of candidate accuracy tolerances. For example, the system can suggest an accuracy tolerance of 0.3, or a range of 0.3 to 0.5, to a user on the user interface presentation 400. The system can also generate a notification (e.g., an alarm) to indicate a user input tolerance accuracy is greater than the suggested candidate accuracy tolerance. For example, the system can prompt an alarm on the user interface presentation 400 if the user inputs a tolerance of 1.0 while the system suggests a candidate tolerance of 0.4.

The system can learn a candidate accuracy tolerance by various means. For example, the system can automatically generate the candidate accuracy using statistical methods. More specifically, the system can store data representing accuracy tolerance for a particular operating environment, and fit the stored data to one or more statistical models using regressions. As another example, the system can apply machine learning algorithms such as neural networks to associate an operating environment with a particular candidate tolerance. More specifically, the system can train a neural network using training examples, each of which includes, for example, an image or video of an operating environment and a measured calibration accuracy for the environment. The system can then perform inference computations for the trained neural network to predict an accuracy tolerance for an input image representing a particular operating environment.

In this specification, a robot is a machine having a base position, one or more movable components, and a kinematic model that can be used to map desired positions, poses, or both in one coordinate system, e.g., Cartesian coordinates or joint angles, into commands for physically moving the one or more movable components to the desired positions or poses. In this specification, a tool is a device that is part of and is attached at the end of the kinematic chain of the one or more moveable components of the robot. Example tools include grippers, welding devices, and sanding devices.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it, software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
receiving a request to perform a calibration process for one or more robots in an operating environment;
in response, performing the calibration process including executing a calibration program that generates movement data representing movements by the one or more robots within the operating environment;
computing a measure of calibration accuracy from the movement data;
receiving an input program to be executed by the one or more robots in the operating environment;
determining that the measure of calibration accuracy generated from performing the calibration process does not satisfy an accuracy tolerance of the input program; and
in response, generating a notification representing that the measure of calibration accuracy generated from performing the calibration process does not satisfy the accuracy tolerance of the input program.

Embodiment 2 is the method of embodiment 1, wherein generating the notification comprises generating a user interface presentation that indicates that the measure of calibration accuracy generated from performing the calibration process does not satisfy the accuracy tolerance of the input program.

Embodiment 3 is the method of embodiment 2, wherein the user interface presentation includes data representing which portion of the input program is associated with the accuracy tolerance.

Embodiment 4 is the method of any one of embodiments 1-3, wherein the input program defines motions to be executed by a virtual representation of the one or more robots in the operating environment.

Embodiment 5 is the method of any one of embodiments 1-4, wherein generating the notification comprises generating the notification without executing the input program by one or more physical robots in the operating environment.

Embodiment 6 is the method of any one of embodiments 1-5, wherein the input program represents a task to be executed by one or more physical robots.

Embodiment 7 is the method of any one of embodiments 1-6, further comprising:
repeatedly executing the input program on the one or more robots in the operating environment; and
repeatedly recomputing the measure of calibration accuracy during the repeated executions of the input program,
wherein determining that the recomputed measure of calibration accuracy does not satisfy the accuracy tolerance specified by the input program occurs after a first iteration of executing the input program.

Embodiment 8 is the method of any one of embodiments 1-7, wherein the accuracy tolerance is generated based on the measure of the calibration accuracy.

Embodiment 9 is the method of any one of embodiments 2-8, further comprising receiving, through the user interface presentation, user input representing the accuracy tolerance of the input program.

Embodiment 10 is the method of any one of embodiments 1-9, further comprising:
determining that the measure of calibration accuracy satisfies the accuracy tolerance; and
in response, executing the input program on one or more robots in the operating environment.

Embodiment 11 is the method of any one of embodiments 1-10, wherein the operating environment is a virtual operating environment and further comprising: subsequently executing the input program on one or more physical robots.

Embodiment 12 is the method of any one of embodiments 1-11, further comprising:
after one or more iterations of executing the input program on the one or more physical robots, computing an updated measure of calibration accuracy;
determining that the updated measure of calibration accuracy does not satisfy the accuracy tolerance; and
in response, generating a notification representing that the updated measure of calibration accuracy for the one or more physical robots does not satisfy the accuracy tolerance of the input program.

Embodiment 13 is the method of any one of embodiments 1-12, further comprising terminating execution of the input program on the one or more physical robots.

Embodiment 14 is the method of any one of embodiments 1-13, wherein the accuracy tolerance represents an accuracy tolerance for a portion of robots in the operating environment, and wherein the notification includes information representing which portion of robots in the operating environment have the measure of calibration accuracy that does not satisfy the accuracy tolerance.

Embodiment 15 is a system comprising one or more computers and one or more storage devices storing instructions that are operable, when executed by the one or more computers, to cause the one or more computers to perform the method of any one of embodiments 1 to 14.

Embodiment 16 is a computer storage medium encoded with a computer program, the program comprising instructions that are operable, when executed by data processing apparatus, to cause the data processing apparatus to perform the method of any one of embodiments 1 to 14.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A computer-implemented method comprising:
   receiving a request to perform a calibration process for one or more physical robots in an operating environment;
   in response, performing the calibration process including executing a calibration program that generates movement data representing movements by the one or more physical robots within the operating environment;
   computing a measure of calibration accuracy from the movement data, wherein the calibration accuracy represents a level of accuracy for poses of the one or more physical robots after performing the calibration process;
   receiving an input program to be executed by the one or more physical robots in the operating environment;
   computing, based on the measure of calibration accuracy and the input program, a measure of execution accuracy for executing the input program by the one or more physical robots in the operating environment;
   determining that the input program cannot be executed on the one or more physical robots in the operating environment based on the computed measure of execution accuracy for executing the input program not satisfying an accuracy tolerance of the input program; and
   in response, generating a notification representing that the input program cannot be executed on the one or more physical robots in the operating environment.

2. The method of claim 1, wherein generating the notification comprises generating a user interface presentation that indicates that the computed measure of execution accuracy for executing the input program does not satisfy the accuracy tolerance of the input program.

3. The method of claim 2, wherein the user interface presentation includes data representing which portion of the input program is associated with the accuracy tolerance.

4. The method of claim 2, further comprising: receiving, through the user interface presentation, user input representing the accuracy tolerance of the input program.

5. The method of claim 1, wherein the input program defines motions to be executed by a virtual representation of the one or more physical robots in the operating environment, and further comprising:
   updating the virtual representation of the one or more physical robots using the movement data to represent the measure of calibration accuracy of the one or more physical robots in the virtual representation,
   wherein determining that the input program cannot be executed on the one or more physical robots comprises executing the input program on the virtual representation and determining that a measure of execution accuracy for executing the input program on the virtual representation does not satisfy the accuracy tolerance of the input program.

6. The method of claim 5, wherein generating the notification comprises generating the notification without executing the input program by the one or more physical robots in the operating environment.

7. The method of claim 1, further comprising:
   repeatedly executing the input program on the one or more physical robots in the operating environment; and
   repeatedly recomputing the measure of execution accuracy for executing the input program during the repeated executions of the input program,
   wherein determining that the recomputed measure of execution accuracy for executing the input program does not satisfy the accuracy tolerance specified by the input program occurs after a first iteration of executing the input program.

8. The method of claim 1, wherein the accuracy tolerance is generated based on the measure of the calibration accuracy.

9. The method of claim 1, further comprising:
   determining that the computed measure of execution accuracy for executing the input program satisfies the accuracy tolerance; and
   in response, executing the input program on the one or more physical robots in the operating environment.

10. The method of claim 1, further comprising:
    after one or more iterations of executing the input program on the one or more physical robots, computing an updated measure of calibration accuracy;
    determining that the updated measure of calibration accuracy does not satisfy the accuracy tolerance; and
    in response, generating a notification representing that the updated measure of calibration accuracy for the one or more physical robots does not satisfy the accuracy tolerance of the input program.

11. The method of claim 10, further comprising terminating execution of the input program on the one or more physical robots.

12. The method of claim 1, wherein the accuracy tolerance represents an accuracy tolerance for a portion of robots in the operating environment, and wherein the notification includes information representing which portion of robots in the operating environment have the measure of execution accuracy for executing the input program that does not satisfy the accuracy tolerance.

13. A system comprising one or more computers and one or more storage devices storing instructions that when executed by one or more computers cause the one or more computers to perform respective operations, the operations comprising:
receiving a request to perform a calibration process for one or more physical robots in an operating environment;
in response, performing the calibration process including executing a calibration program that generates movement data representing movements by the one or more physical robots within the operating environment;
computing a measure of calibration accuracy from the movement data, wherein the calibration accuracy represents a level of accuracy for poses of the one or more physical robots after performing the calibration process;
receiving an input program to be executed by the one or more physical robots in the operating environment;
computing, based on the measure of calibration accuracy and the input program, a measure of execution accuracy for executing the input program by the one or more physical robots in the operating environment;
determining that the input program cannot be executed on the one or more physical robots in the operating environment based on the computed measure of execution accuracy for executing the input program not satisfying an accuracy tolerance of the input program; and
in response, generating a notification representing that the input program cannot be executed on the one or more physical robots in the operating environment.

14. The system of claim 13, wherein generating the notification comprises generating a user interface presentation that indicates that the computed measure of execution accuracy for executing the input program does not satisfy the accuracy tolerance of the input program.

15. The system of claim 13, further comprising:
repeatedly executing the input program on the one or more physical robots in the operating environment; and
repeatedly recomputing the measure of execution accuracy for executing the input program during the repeated executions of the input program,
wherein determining that the recomputed measure of execution accuracy for executing the input program does not satisfy the accuracy tolerance specified by the input program occurs after a first iteration of executing the input program.

16. The system of claim 13, wherein the input program defines motions to be executed by a virtual representation of the one or more physical robots in the operating environment, and further comprising:
updating the virtual representation of the one or more physical robots using the movement data to represent the measure of calibration accuracy of the one or more physical robots in the virtual representation,
wherein determining that the input program cannot be executed on the one or more physical robots comprises executing the input program on the virtual representation and determining that a measure of execution accuracy for executing the input program on the virtual representation does not satisfy the accuracy tolerance of the input program.

17. One or more non-transitory computer-readable storage media storing instructions that when executed by one or more computers cause the one or more computers to perform respective operations, the respective operations comprising:
receiving a request to perform a calibration process for one or more physical robots in an operating environment;
in response, performing the calibration process including executing a calibration program that generates movement data representing movements by the one or more physical robots within the operating environment;
computing a measure of calibration accuracy from the movement data wherein the calibration accuracy represents a level of accuracy for poses of the one or more physical robots after performing the calibration process;
receiving an input program to be executed by the one or more physical robots in the operating environment;
computing, based on the measure of calibration accuracy and the input program, a measure of execution accuracy for executing the input program by the one or more physical robots in the operating environment;
determining that the input program cannot be executed on the one or more physical robots in the operating environment based on the computed measure of execution accuracy for executing the input program not satsifying an accuracy tolerance of the input program; and
in response, generating a notification representing that the input program cannot be executed on the one or more physical robots in the operating environment.

18. The non-transitory computer-readable storage media of claim 17, wherein generating the notification comprises generating a user interface presentation that indicates that the computed measure of execution accuracy for executing the input program does not satisfy the accuracy tolerance of the input program.

19. The non-transitory computer-readable storage media of claim 17, further comprising:
repeatedly executing the input program on the one or more physical robots in the operating environment; and
repeatedly recomputing the measure of execution accuracy for executing the input program during the repeated executions of the input program,
wherein determining that the recomputed measure of execution accuracy for executing the input program does not satisfy the accuracy tolerance specified by the input program occurs after a first iteration of executing the input program.

20. The non-transitory computer-readable storage media of claim 17, wherein the input program defines motions to be executed by a virtual representation of the one or more physical robots in the operating environment, and further comprising:
updating the virtual representation of the one or more physical robots using the movement data to represent the measure of calibration accuracy of the one or more physical robots in the virtual representation,
wherein determining that the input program cannot be executed on the one or more physical robots comprises executing the input program on the virtual representation and determining that a measure of execution accuracy for executing the input program on the virtual representation does not satisfy the accuracy tolerance of the input program.

* * * * *